(12) United States Patent
Chang

(10) Patent No.: US 7,458,701 B2
(45) Date of Patent: *Dec. 2, 2008

(54) LED LAMP ASSEMBLY

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/773,979

(22) Filed: Jul. 6, 2007

(65) Prior Publication Data

US 2008/0239751 A1    Oct. 2, 2008

(30) Foreign Application Priority Data

Mar. 27, 2007    (CN) .......................... 2007 1 0200335

(51) Int. Cl.
*F21V 7/00* (2006.01)
(52) U.S. Cl. .................. 362/248; 362/240; 362/247; 362/301; 362/302
(58) Field of Classification Search .............. 362/240, 362/241, 247, 248, 298, 300–303, 351
See application file for complete search history.

(56) References Cited

U.S. PATENT DOCUMENTS

| | | | | |
|---|---|---|---|---|
| 4,271,408 A * | 6/1981 | Teshima et al. | ............... | 345/83 |
| 6,431,728 B1 * | 8/2002 | Fredericks et al. | .......... | 362/249 |
| 6,491,412 B1 * | 12/2002 | Bowman et al. | ............ | 362/249 |
| 6,729,746 B2 * | 5/2004 | Suehiro et al. | ............... | 362/241 |
| 6,886,982 B2 * | 5/2005 | Reynolds | ..................... | 383/68 |
| 7,181,378 B2 * | 2/2007 | Benitez et al. | ................. | 703/2 |

* cited by examiner

*Primary Examiner*—John A Ward
(74) *Attorney, Agent, or Firm*—Frank R. Niranjan

(57) ABSTRACT

An exemplary LED lamp includes a housing having an opening, a printed circuit board, at least one LED, a light reflective plate, a light reflective module and a lamp cover. The printed circuit board is positioned on a bottom of the housing. The LED is electrically connected with the printed circuit board. The light reflective plate defines at least one through hole, the LED passing through the corresponding through hole. The light reflective module includes a bottom reflective plate, at least two opposite reflective sidewalls, at least one light-shielding sheet extending at midsections from the opposing reflective sidewalls. The bottom reflective plate defines at least one first cutout, the at least one LED passing through the corresponding first cutout. The at least one light-shielding sheet defines a plurality of light holes and covers the corresponding LED. The LED lamp assembly has a uniform luminance.

16 Claims, 10 Drawing Sheets

LED LAMP ASSEMBLY

CROSS-REFERENCE TO RELATED APPLICATIONS

This application is related to a copending U.S. patent application, which is: application Ser. No. 11/766,106, and entitled "LED LAMP ASSEMBLY". In the copending application, the inventor is Shao-Han Chang. All of the copending applications have the same assignee as the present application. The disclosures of the above identified application are incorporated herein by reference.

BACKGROUND OF THE INVENTION

1. Field of the Invention

The present invention relates to a lamp assembly, and particularly to a light emitting diode lamp assembly employed in a direct type backlight module of a liquid crystal display.

2. Discussion of the Related Art

Typically, light emitting diodes (LEDs) are preferred over other types of light sources because LEDs exhibits low energy consumption, long service life, and other advantages. Therefore, LEDs are widely used as light sources.

FIG. 1 illustrates a typical LED lamp assembly 10 using LEDs as a light source. The LED lamp assembly 10 includes a housing 11, a printed circuit board 12, a plurality of side-lighting type LEDs 13, a light reflective module 14, a plurality of circular reflective layers 15 and a lamp cover 16. The housing 11 is an elongated, hollow structure having an opening 112. The LEDs 13 are arranged apart and electrically connected to the printed circuit board 12. The printed circuit board 12 with the LEDs 13 is disposed on a bottom surface of the housing 11. The light reflective module 14 includes a rectangular bottom reflective plate 144 and four connecting sidewalls 142 extending from a periphery of the bottom reflective plate 144. The bottom reflective plate 144 defines a plurality of through holes 146, configured for allowing the light-emitting portions of the LEDs 13 to pass through. The light reflective module 14 can be correspondingly mounted into the housing 11 via the opening 112. The circular reflective layers 15 are positioned at the tops of the LEDs 13 respectively. The lamp cover 16 is fixed on the opening 112 of the housing 11. Light from the light-emitted portions of the LEDs 13 is substantially reflected at the sidewalls 142 and the bottom reflective plate 144, finally output from the lamp cover 16. With the help of the light reflective module 14, an efficiency of utilization of light energy of the LED lamp assembly 10 is increased.

Nevertheless, the brightness above the LEDs 13 of the LED lamp assembly 10 is decreased due to the light reflection off of the circular reflective layers 15, and a plurality of dark areas between the two adjacent LEDs 13 still occur. Accordingly a uniform brightness of the LED lamp assembly 10 is low.

What is needed, therefore, is an LED lamp assembly which have a uniform brightness.

SUMMARY

An LED lamp assembly according to a preferred embodiment includes a housing, a printed circuit board, at least one LED, a light reflective plate, a light reflective module and a lamp cover. The housing defines an opening. The printed circuit board is positioned on a bottom of the housing. The at least one LED is electrically connected with the printed circuit board. The light reflective plate defines at least one through hole, the LED passing through the corresponding through hole. The light reflective module includes a bottom reflective plate disposed above the light reflective plate, at least two opposite reflective sidewalls extending from a periphery of the bottom reflective plate, at least one light-shielding sheet extending at midsections from the opposing reflective sidewalls. The bottom reflective plate defines at least one first cutout, the at least one LED passing through the corresponding first cutout. The at least one light-shielding sheet defines a plurality of light holes and covers the corresponding LED. The lamp cover is fixed on the opening of the housing.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present LED lamp assembly. Moreover, in the drawings, like reference numerals designate corresponding parts throughout the several views, and all the views are schematic.

DETAILED DESCRIPTION OF THE PREFERRED EMBODIMENTS

References will now be made to the drawings to describe preferred embodiments of the present LED lamp assembly, in detail.

Figure 1:
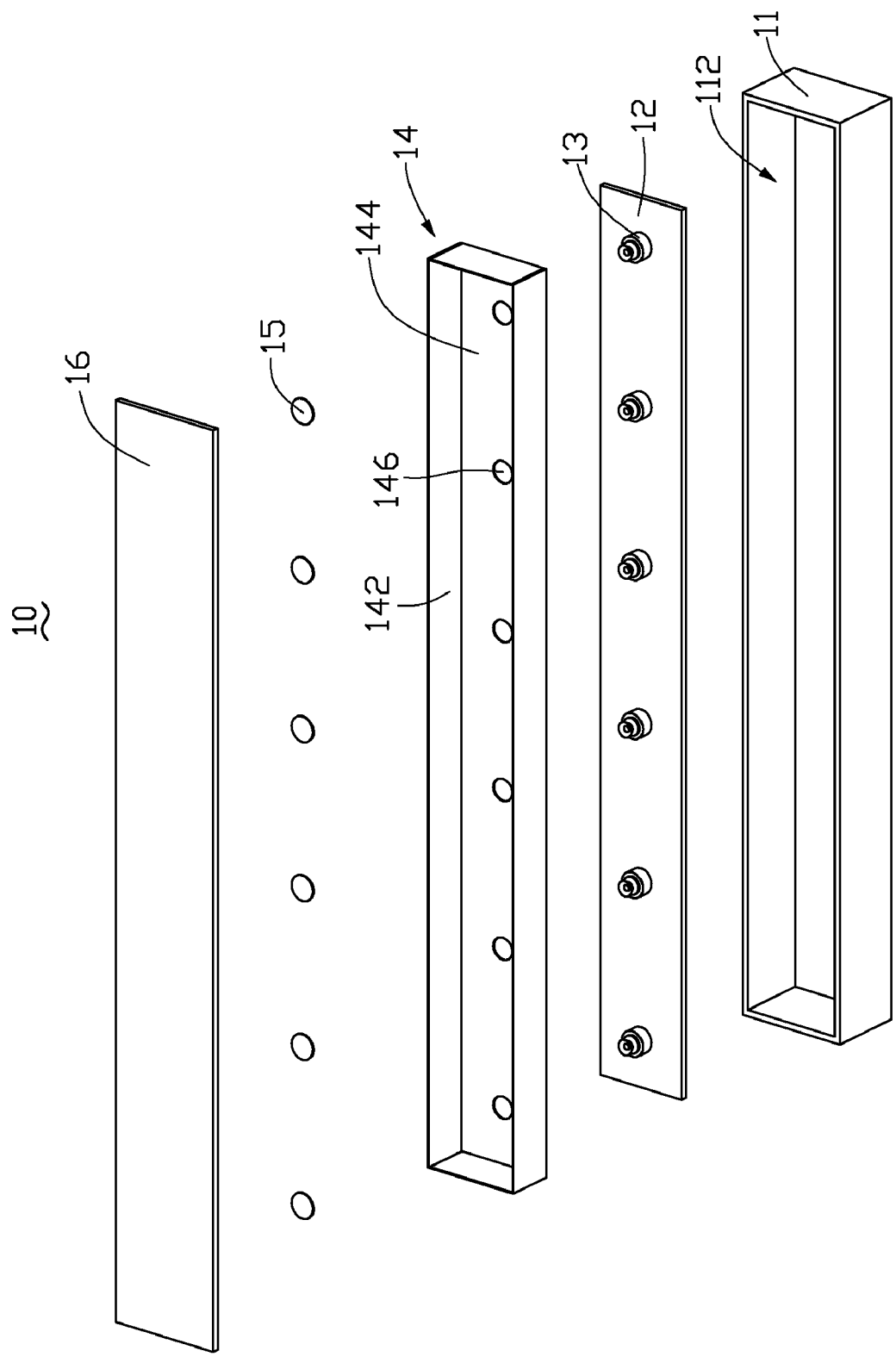
FIG. 1 is an exploded, isometric view of a conventional LED lamp assembly.
Figure 2:
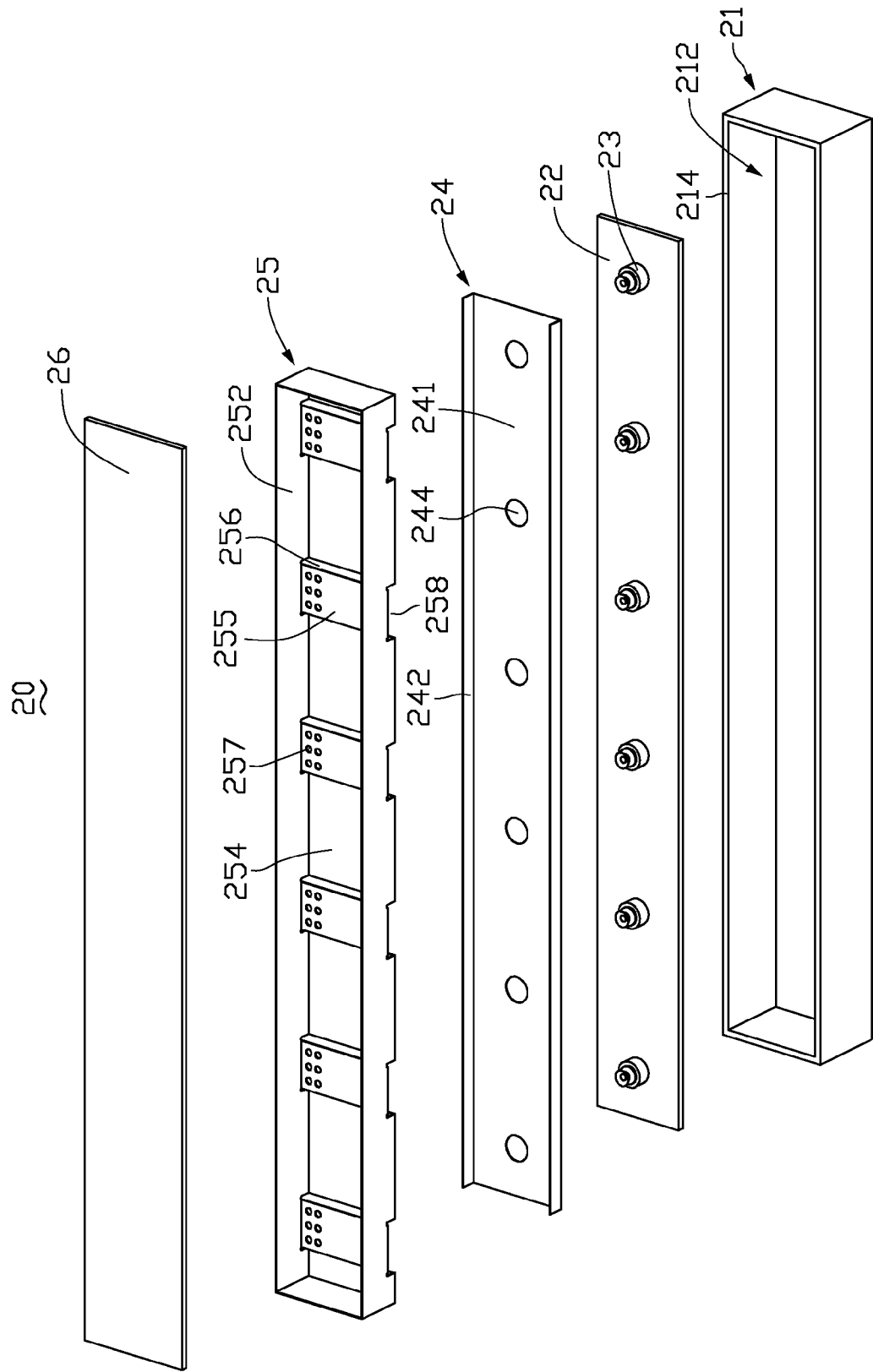
FIG. 2 is an exploded, isometric view of an LED lamp assembly according to a preferred embodiment of the present invention.
Figure 3:
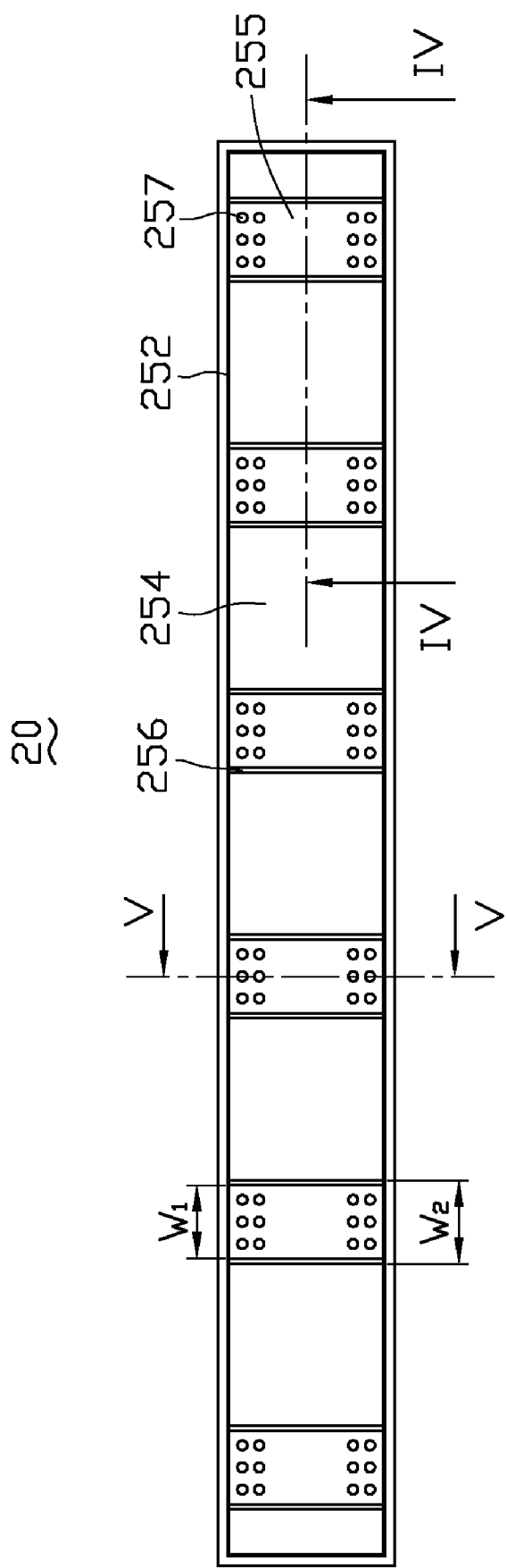
FIG. 3 is a top plan view of the LED lamp assembly without a lamp cover.
Figure 4:
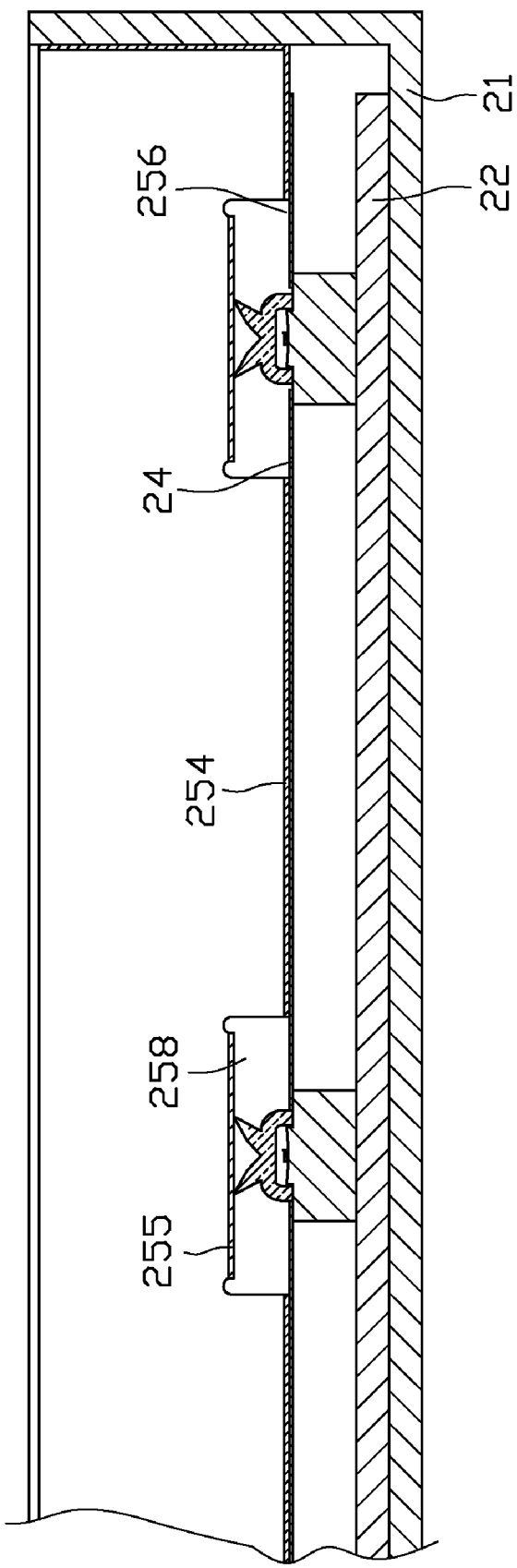
FIG. 4 is a side, enlarged, partial, cross-sectional view of the LED lamp assembly of FIG. 3, taken along line IV-IV thereof.

Referring to FIGS. 2 through 4, an LED lamp assembly 20 in accordance with a preferred embodiment of the present invention is shown. The LED assembly 20 includes a housing 21, a printed circuit board 22, a plurality of sided-emitting type LEDs 23, a light reflective plate 24, a light reflective module 25, and a lamp cover 26. The housing 21 is an elongated, hollow structure defining a receiving opening 212. The LEDs 23 are separately arranged and electrically connected to the printed circuit board 22. The printed circuit board 22 including the LEDs 23 is disposed in the receiving opening 212 on a bottom surface of the housing 21.

Figure 5:
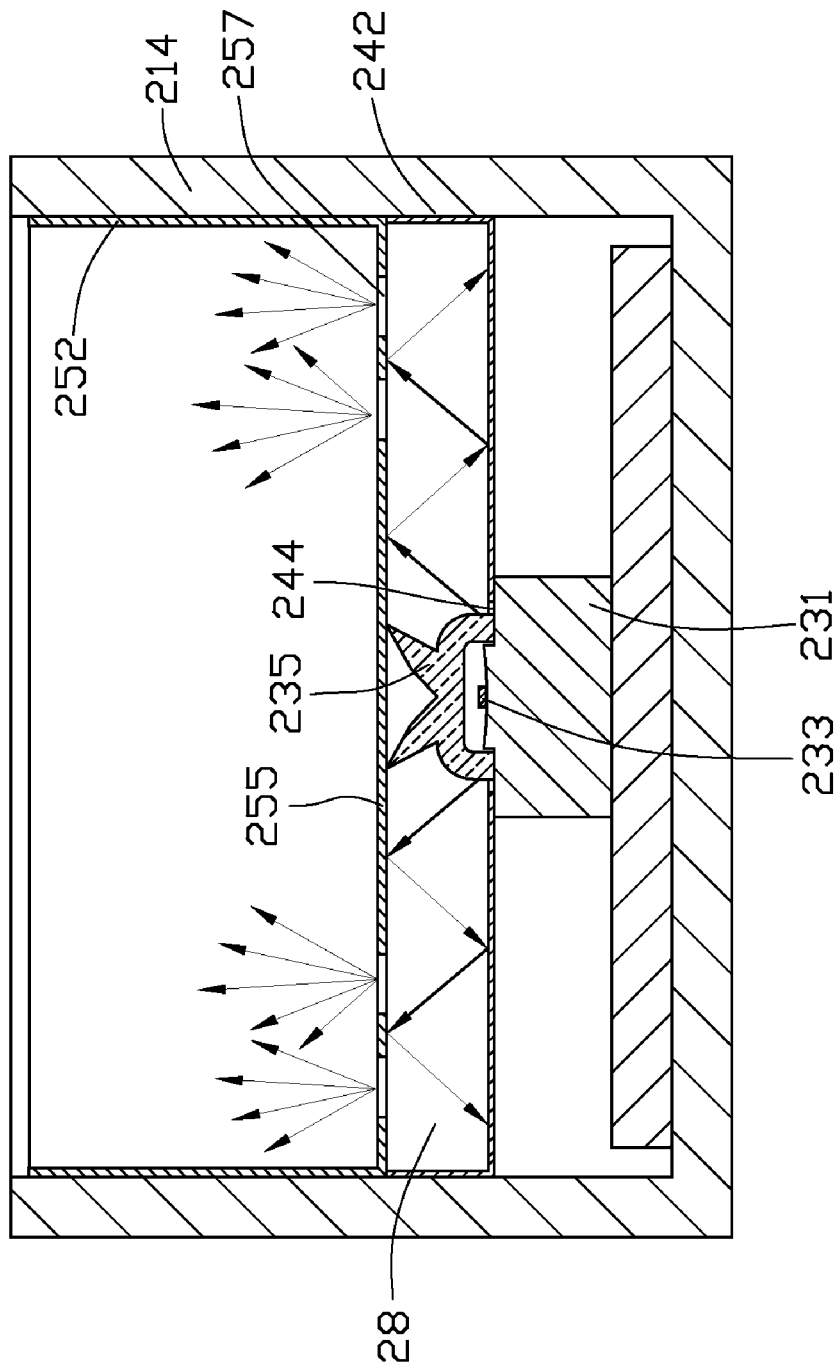
FIG. 5 is a side, enlarged, cross-sectional view of the LED lamp assembly of FIG. 3, taken along line V-V thereof.

Referring to FIG. 5, each LED 23 includes a base portion 231, a semiconductor chip 233 fixed on the base portion 231, and an optical lens 235. The optical lens 235 is bonded or snap-fitted onto the base portion 231 sealing the semiconductor chip 233 within. A width of the base portion 231 is larger than that of the optical lens 235.

Also referring to FIGS. 2 through 4, the light reflective plate 24 is a rectangular plate that can be mounted into the receiving opening 212 of the housing 21. The light reflective plate 24 defines a plurality of through holes 244 for the optical lenses 235 of the LEDs 23 to pass through the corresponding through holes 244. The base portions 231 of the LEDs 23 support the light reflective plate 24. In this embodiment, the light reflective plate 24 further includes at least a pair of opposite sidewalls 242 extending from two opposite longer ends of the light reflective plate 24.

The light reflective module 25 can be mounted into the opening 212 of the housing 21, disposed above the light reflective plate 24. The light reflective module 25 includes a rectangular bottom reflective plate 254 and four connecting sidewalls 252 extending vertically from a periphery of the bottom reflective plate 254. Generally, the light reflective module 25 is integrally manufactured by stamping a metal sheet. Inner surfaces of the sidewalls 252 and a bottom surface of the bottom reflective plate 254 are high reflective surfaces; the sidewalls 252 and the bottom reflective plate 254 are made of a combination of metal materials and/or plastic materials. The bottom reflective plate 254 defines a plurality of first cutouts 256 corresponding to the LEDs 23 on the printed circuit board 22. The bottom reflective plate 254 is disposed on the light reflective plate 24, and the optical lenses 235 of the LEDs 23 pass through the first cutouts 256 correspondingly. The light reflective module 25 further includes a plurality of light-shielding sheets 255. Each LED 23 is covered by one of the light-shielding sheets 255 correspondingly. Each light-shielding sheet 255 extends at midsections from opposing sidewalls 252. In the preferred embodiment, the opposing sidewalls 252 are longest sidewalls of the four connecting sidewalls 252. A plurality of light holes 257 are defined at ends of each light-shielding sheet 255 adjacent to the two opposite sidewalls 252.

In this embodiment, the light holes 257 have same shapes and sizes, and are formed in a matrix manner at the ends of each light-shielding sheet 255. Referring to FIG. 3, each of the first cutouts 256 and the light-shielding sheets 255 are both rectangular, but a width $W_2$ of each first cutout 256 is larger than a width $W_1$ of each light-shielding sheet 255. Also referring to FIGS. 2 and 4, each of the two opposite longest sidewalls 252 of the light reflective module 25 further defines a plurality of second cutouts 258 below the light-shielding sheet 255, the second cutouts 258 communicate with the first cutout 256 correspondingly. A height of each sidewall 242 of the light reflective plate 24 is larger than or equal to that of the second cutouts 258. When the light reflective module 25 is mounted onto the light reflective plate 24, the two opposite sidewalls 242 of the light reflective plate 24 seal the second cutouts 258.

The lamp cover 26 is fixed on the opening 212 of the housing 21. The lamp cover 26 can be either a transparent plate or a light diffusion plate. The sidewalls 252 of the light reflective module 25 and sidewalls 214 of the housing 21 may, correspondingly, further define a plurality of latching elements (not shown), thus the light reflective module 25 and the housing 21 can be assembled together securely.

Also referring to FIG. 5, the bottom reflective plate 254, the light-shielding sheets 255, and the light reflective plate 244 cooperatively define a light-mixing space 28. Light from the optical lens 235 of the LEDs 23 are reflected many times between the light-shielding sheets 255 and the bottom reflective plate 254 of the light mixing space 28 before substantially exiting at an area between the two adjacent light-shielding sheets 255. As a result, a light brightness above the gaps of the LED lamp assembly 20 is increased. In addition, a light brightness above the LEDs 23 of the LED lamp assembly 20 is decreased due to the light reflection of the light-shielding sheets 255. Furthermore, some of the light projects to the lamp cover 26 via the light holes 257 of the light-shielding sheets 255. Since the light holes 257 are formed on the two sides of each of the light-shielding sheets 255 adjacent to the two sidewalls of the housing 21, a light brightness adjacent to the two sidewalls of the LED lamp assembly 20 is increased. Thus, a uniformity of light output from the LED lamp assembly 20 is increased.

It should be noted that, one of the two opposite shortest sidewalls 252 of the light reflective module 25, the two opposite longest sidewalls 242 of the light reflective plate 24, and the second cutouts 258 can be omitted.

It is to be understood that, by selecting the size and shape of the light holes 257, or distribution of the light holes 257, a uniformity of the light brightness above the light-shielding sheets 255 of the LED lamp assembly 20 is adjustable. In an alternative embodiment, in order to obtain a good optical performance such as uniformity of light output from the LED lamps assembly 20, 30, each light-shielding sheet 255, 355 of the LED lamps assembly 20, 30 may have the same distributions as shown in FIGS. 6 through 10.

Figure 6:
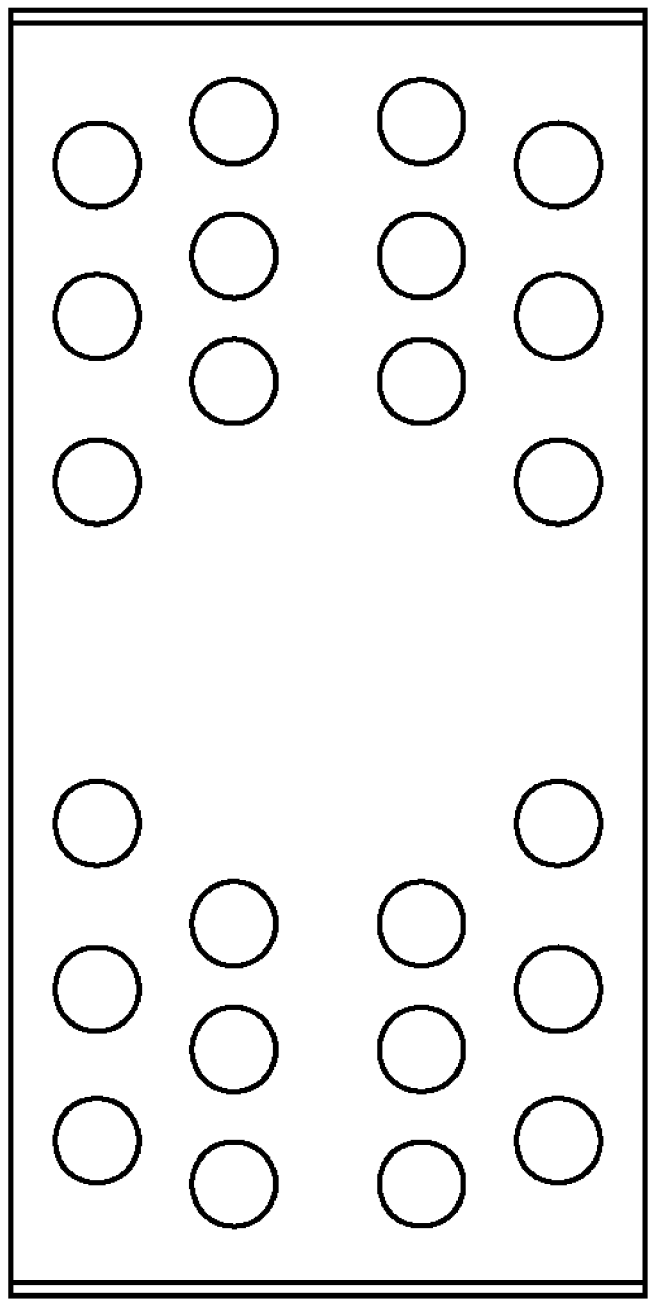
FIGS. 6 through 10 are top plan views of distributions of light holes defined in light-shielding sheets of the LED lamp assembly of the present invention.

Referring to FIG. 6, a distribution of the light holes of a light-shielding sheet is described below. A shape of each of the light holes is circular. A shape and an area of each of the light holes are same. The light-shielding sheet defines a middle point. The light holes are arranged apart along a plurality of imaginary circles that have a same center. The center of the imaginary circle is also a middle point of the light-shielding sheet.

Figure 7:
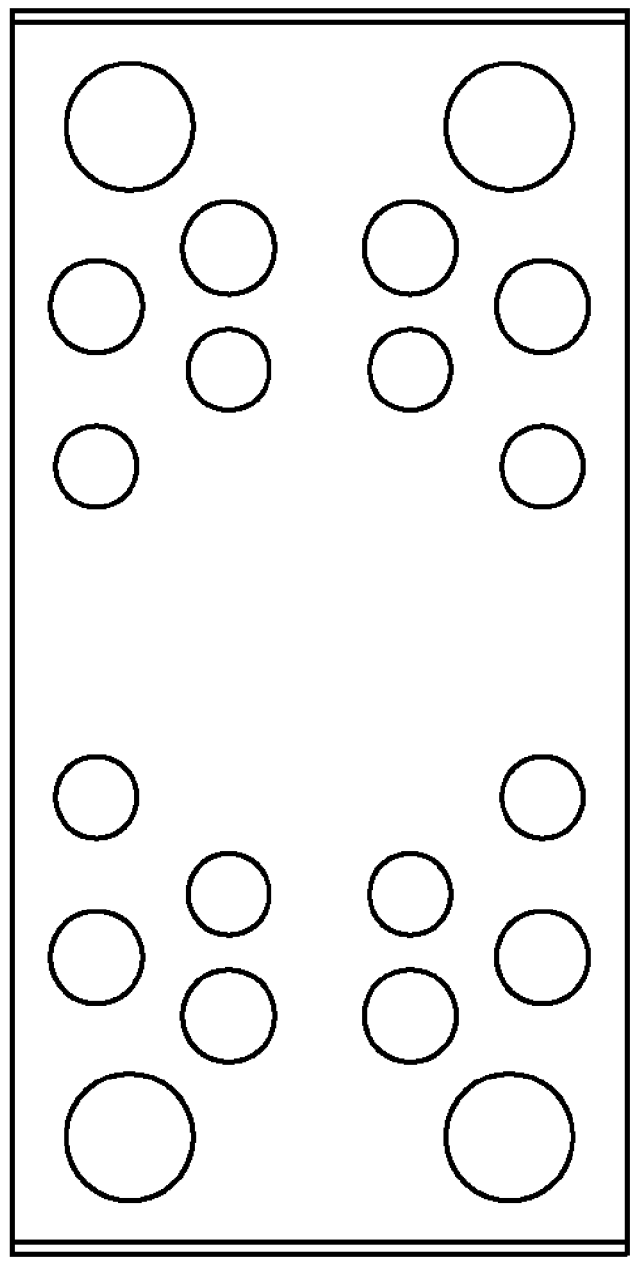

Referring to FIG. 7, a distribution design of the light holes of a light-shielding sheet is described below. A shape of each of the light holes is circular, but have a different radius. The light-shielding sheet defines a middle point. The light holes are arranged apart along a plurality of imaginary circles that have a same center. The center of the imaginary circles is also a middle point of the light-shielding sheet. The radius of the light holes increase along a direction away from the center of the imaginary circles.

Figure 8:
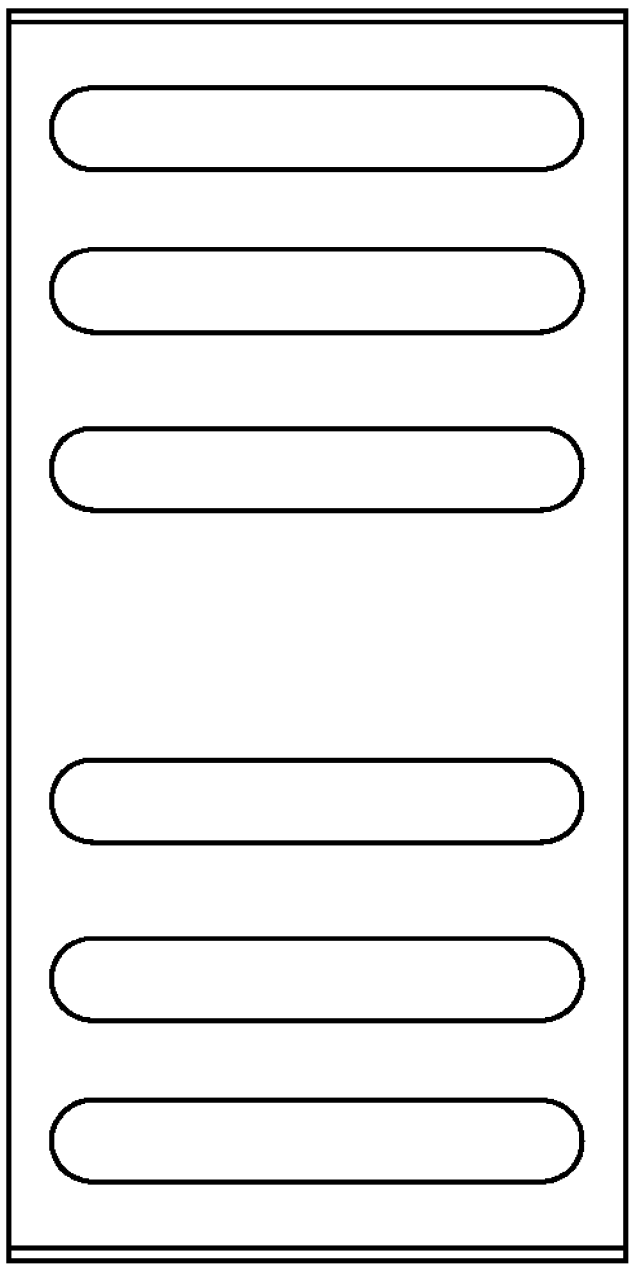

Referring to FIG. 8, a distribution design of the light holes of a light-shielding sheet is described below. A shape of each of the light holes is an elongated opening parallel to the sidewalls of the housing of the LED lamp. At each edge of the light-shielding sheet, the three light holes are equidistant from each other. The length of the three light holes is the same.

Figure 9:
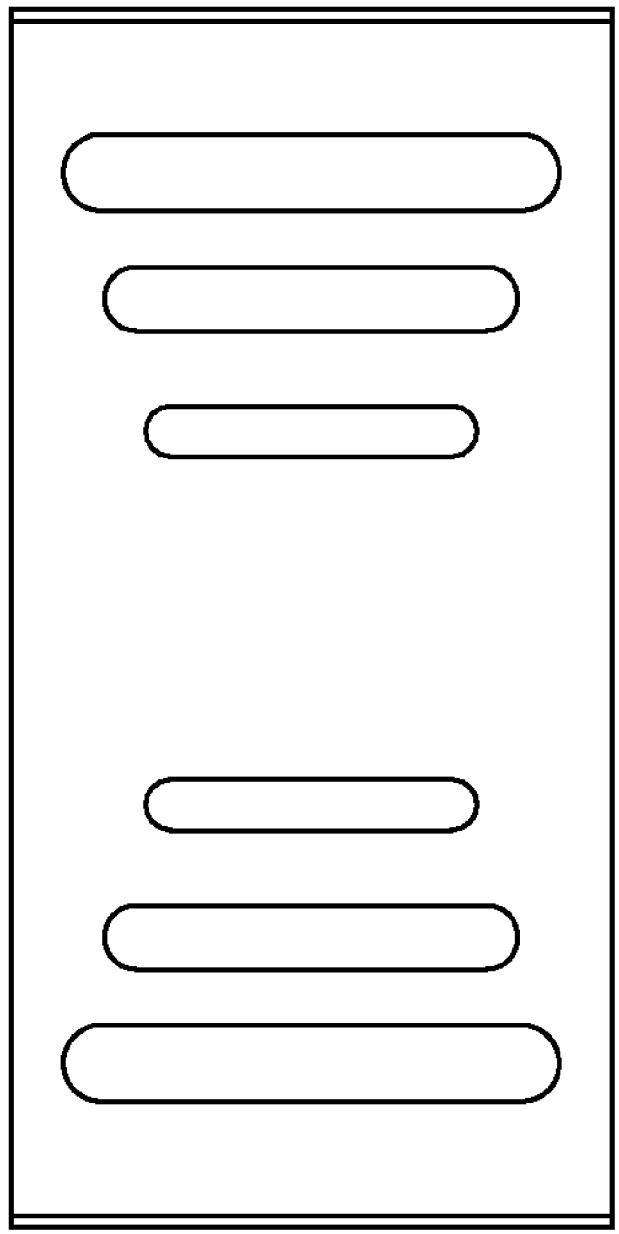

Referring to FIG. 9, a distribution design of the light holes of a light-shielding sheet is described below. A shape of each of the light holes is an elongated opening parallel to the sidewalls of the housing of the LED lamp. At each edge of the light-shielding sheet, the three light holes are equidistant from each other. Lengths of the three light holes are different from each other, lengths of the light holes progressively increases along a direction away from a middle portion of the light-shielding sheet.

Figure 10:
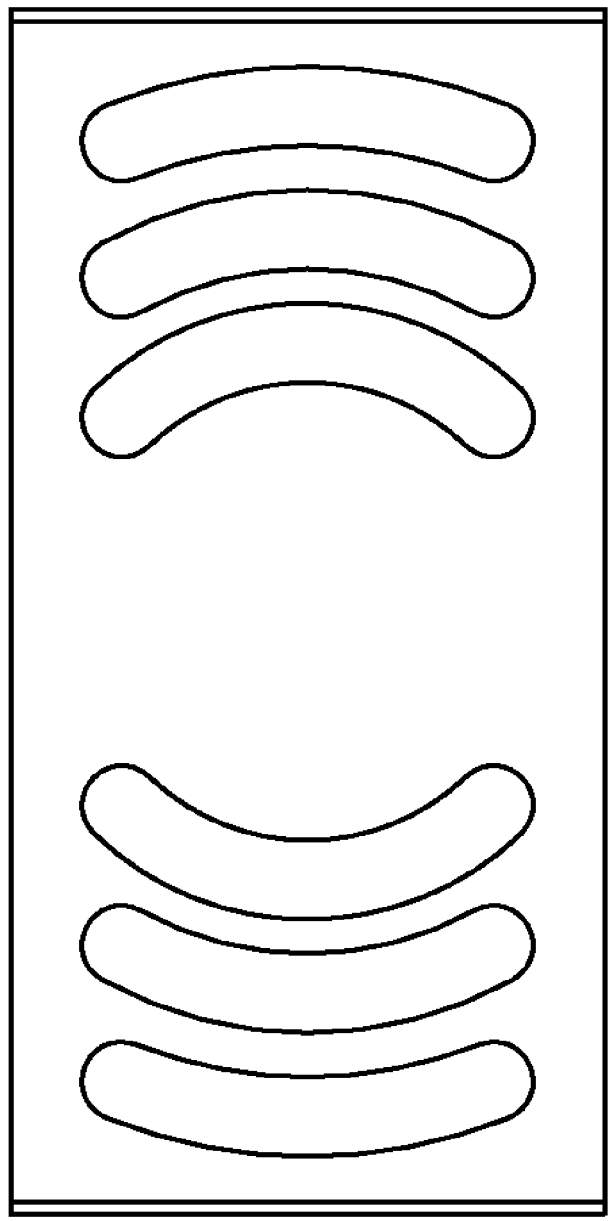

Referring to FIG. 10, a distribution design of the light holes of a light-shielding sheet is described below. A shape of each of the light holes is an annular opening. The three light holes of one side of the light-shielding sheet are equidistant from each other. The annular light holes have a same center that is a middle portion of the light-shielding sheet.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An LED lamp assembly comprising:
a housing defining an opening;
a printed circuit board positioned on a bottom of the housing;
at least one LED electrically connected to the printed circuit board;
a light reflective plate defining at least one through hole, the at least one LED partially passing through the through hole;
a light reflective module comprising a bottom reflective plate disposed above the light reflective plate, at least two opposite reflective sidewalls extending from a periphery of the bottom reflective plate, at least one light-shielding sheet extending at midsections from the opposing reflective sidewalls, wherein the bottom reflective plate defines at least one first cutout therein, the at least one LED partially passing through the corresponding first cutout; and the at least one light-shielding sheet defines a plurality of light holes and covers the corresponding LED; and
a lamp cover fixed on the opening of the housing.

2. The LED lamp assembly according to claim 1, wherein each LED comprises a base portion, a semiconductor chip fixed on the base portion, and an optical lens, the optical lens being bonded or snap-fitted onto the base portion and sealing the semiconductor chip therein.

3. The LED lamp assembly according to claim 2, wherein the optical lens of the LED passes through the corresponding through hole and the base portion of the LED supports the light reflective plate.

4. The LED lamp assembly according to claim 1, wherein each of the two opposite longest sidewalls of the light reflective module further defines at least one second cutout below the corresponding light-shielding sheet, the second cutouts communicating with the corresponding first cutout.

5. The LED lamp assembly according to claim 4, wherein the light reflective plate further comprises at least two opposite sidewalls corresponding to the two opposite sidewalls of the light reflective module, configured for sealing the second cutouts.

6. The LED lamp assembly according to claim 5, wherein a height of each sidewall of the light reflective plate is larger than or equal to that of the second cutout.

7. The LED lamp assembly according to claim 1, wherein inner surfaces of the sidewalls of the light reflective module and bottom surface of the bottom reflective plate are both high reflectivity surfaces.

8. The LED lamp assembly according to claim 1, wherein the light reflective module is made of one of metal materials and plastic materials.

9. The LED lamp assembly according to claim 1, wherein the LED is a sided-emitting type LED.

10. The LED lamp assembly according to claim 1, wherein the lamp cover is selected from one of transparent plate and light diffusion plate.

11. The LED lamp assembly according to claim 1, wherein a shape and an area of each of the light holes are the same; a shape of each of the light holes is circular; the light holes are defined at two ends of the light-shielding sheet in a matrix manner.

12. The LED lamp assembly according to claim 1, wherein a shape and an area of each of the light holes are the same; a shape of each of the light holes is circular; the light-shielding sheet defines a middle point; the light holes are arranged apart along a plurality of imaginary circles that have a same center; and the center of the imaginary rounds is also the middle point of the light-shielding sheet.

13. The LED lamp assembly according to claim 1, wherein a shape of each of the light holes is circular, but having different radii; the light-shielding sheet defines a middle point thereon; the light holes are arranged apart along a plurality of imaginary circles that have a same center; the center of the imaginary circles is also a middle point of the light-shielding sheet; and the radius of the light holes increase along a direction away from the middle point of the light-shielding sheet.

14. The LED lamp assembly according to claim 1, wherein a shape of each of the light holes is an elongated opening parallel to the sidewalls of the housing; the light holes of one side of the light-shielding sheet are equidistant from each other; and the length of the three light holes is the same.

15. The LED lamp assembly according to claim 1, wherein a shape of each of the light holes is an elongated opening parallel to the sidewalls of the housing; the light holes of one side of the light-shielding sheet are equidistant from each other; lengths of the three light holes are different from each other; and lengths of the light holes, at each edge of the light-shielding sheet, progressively increasing along a direction away from the middle portion of the light-shielding sheet.

16. The LED lamp assembly according to claim 1, wherein a shape of each of the light holes is an annular opening; the light holes of one side of the light-shielding sheet are equidistant from each other; and the annular light holes have a same center that is a middle portion of the light-shielding sheet.

* * * * *